United States Patent
Debnath et al.

(10) Patent No.: US 10,929,765 B2
(45) Date of Patent: Feb. 23, 2021

(54) CONTENT-LEVEL ANOMALY DETECTION FOR HETEROGENEOUS LOGS

(71) Applicant: NEC Laboratories America, Inc., Princeton, NJ (US)

(72) Inventors: Biplob Debnath, Princeton, NJ (US); Hui Zhang, Princeton Junction, NJ (US); Jianwu Xu, Lawrenceville, NJ (US); Nipun Arora, Plainsboro, NJ (US); Guofei Jiang, Princeton, NJ (US); Bo Zong, Plainsboro, NJ (US)

(73) Assignee: NEC Corporation

( * ) Notice: Subject to any disclaimer, the term of this patent is extended or adjusted under 35 U.S.C. 154(b) by 830 days.

(21) Appl. No.: 15/678,751

(22) Filed: Aug. 16, 2017

(65) Prior Publication Data

US 2018/0174065 A1    Jun. 21, 2018

Related U.S. Application Data (60) Provisional application No. 62/434,506, filed on Dec. 15, 2016.

(51) Int. Cl.
*G06N 7/00* (2006.01)
*G06N 20/00* (2019.01)
*G06F 11/00* (2006.01)
*G06F 11/34* (2006.01)

(52) U.S. Cl.
CPC .............. *G06N 7/00* (2013.01); *G06F 11/00* (2013.01); *G06F 11/3452* (2013.01); *G06F 11/3476* (2013.01); *G06N 20/00* (2019.01)

(58) Field of Classification Search
CPC combination set(s) only.
See application file for complete search history.

(56) References Cited

U.S. PATENT DOCUMENTS

| 8,495,429 B2 | 7/2013 | Fu et al. |
| 8,976,661 B2 * | 3/2015 | Lumezanu .......... H04L 63/1425 370/235 |
| 9,003,240 B2 * | 4/2015 | Rhee .................... G06F 11/3636 714/47.3 |

(Continued)

FOREIGN PATENT DOCUMENTS

KR    10-2016-012076 A    10/2016

OTHER PUBLICATIONS

Wang et al., "Anagram: A Content Anomaly Detector Resistant to Mimicry Attack", Proceedings of the 9th International Conference on Recent Advances in Intrusion Detection. Sep. 20-22, 2006. pp. 1-24.

*Primary Examiner* — Michael B Holmes
(74) *Attorney, Agent, or Firm* — Joseph Kolodka (57) ABSTRACT

A computer-implemented method for automatically analyzing log contents received via a network and detecting content-level anomalies is presented. The computer-implemented method includes building a statistical model based on contents of a set of training logs and detecting, based on the set of training logs, content-level anomalies for a set of testing logs. The method further includes maintaining an index and metadata, generating attributes for fields, editing model capability to incorporate user domain knowledge, detecting anomalies using field attributes, and improving anomaly quality by using user feedback.

18 Claims, 9 Drawing Sheets

(56) References Cited

U.S. PATENT DOCUMENTS

| | | | |
|---|---|---|---|
| 9,026,855 B2* | 5/2015 | Sharma | G06F 11/0709 |
| | | | 714/37 |
| 9,075,912 B2* | 7/2015 | Rhee | G06F 11/34 |
| 9,092,568 B2* | 7/2015 | Rhee | G06F 11/3636 |
| 9,098,342 B2* | 8/2015 | Jiang | G06F 9/5061 |
| 9,106,576 B2* | 8/2015 | Lumezanu | H04L 12/4641 |
| 9,124,496 B2* | 9/2015 | Zhang | H04L 41/0833 |
| 9,143,452 B2* | 9/2015 | Lumezanu | H04L 47/12 |
| 9,223,617 B2* | 12/2015 | Singh | G06F 9/4856 |
| 9,245,125 B2* | 1/2016 | Li | G06F 21/577 |
| 9,245,235 B2* | 1/2016 | Chen | G06F 11/3072 |
| 9,253,042 B2* | 2/2016 | Lumezanu | H04L 41/12 |
| 2011/0296244 A1 | 12/2011 | Fu et al. | |
| 2014/0344622 A1 | 11/2014 | Huang et al. | |
| 2014/0344662 A1 | 11/2014 | Isabel et al. | |
| 2015/0025875 A1 | 1/2015 | Perrone | |
| 2017/0126718 A1* | 5/2017 | Baradaran | H04L 63/0281 |
| 2017/0277997 A1* | 9/2017 | Zong | G06F 16/2477 |
| 2019/0033851 A1* | 1/2019 | Maurer | G06N 3/0445 |

* cited by examiner

CONTENT-LEVEL ANOMALY DETECTION FOR HETEROGENEOUS LOGS

RELATED APPLICATION INFORMATION

This application claims priority to Provisional Application No. 62/434,506, filed on Dec. 15, 2016, incorporated herein by reference in its entirety.

BACKGROUND

Technical Field

The present invention relates to analyzing log messages and, more particularly, to automatically analyzing log contents and detecting anomalies if any content is statistically different from normal working behaviors.

Description of the Related Art

A software system, such as a program executed on a computer, can generate a console log message that may be used to troubleshoot the program. Console log messages are typically unstructured free-form text strings, which can record events or states of interest and capture a system developer's intent. These logs can be read by a developer or user to detect the events, states and other occurrences. Usually, when a program execution fails (e.g., does not perform according to expectations), system operators can examine recorded log files to gain insight about the failure, and find out the potential root causes.

One mechanism to detect content-level anomaly is to parse every log into various tokens based on a set of delimiters (e.g., comma, colon, space, tab, etc.), and an index can be maintained to identify unique tokens from a set of training (e.g., history) logs. During testing, if a log token is absent in the index, then that log message is reported as an anomaly. The main issue of this approach is that it creates lot of false positive results.

SUMMARY

A computer-implemented method for automatically analyzing log contents received via a network and detecting content-level anomalies is presented. The method includes building a statistical model based on contents of a set of training logs and detecting, based on the set of training logs, content-level anomalies for a set of testing logs.

A system for automatically analyzing log contents received via a network and detecting content-level anomalies is presented. The system includes a memory and a processor in communication with the memory, wherein the processor is configured to build a statistical model based on contents of a set of training logs and detect, based on the set of training logs, content-level anomalies for a set of testing logs.

A non-transitory computer-readable storage medium including a computer-readable program for automatically analyzing log contents received via a network and detecting content-level anomalies is presented, wherein the computer-readable program when executed on a computer causes the computer to perform the steps of building a statistical model based on contents of a set of training logs and detecting, based on the set of training logs, content-level anomalies for a set of testing logs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The Internet of Things (IoT) enables advanced connectivity of computing and embedded devices through internet infrastructure. IoT involves machine-to-machine communications (M2M), where it is important to continuously monitor connected machines to detect any anomaly or bug, and resolve them quickly to minimize downtime. Logging is a commonly used mechanism to record machines' behaviors and various states for maintenance and troubleshooting. Logs provide a continuous snapshot of the system behaviors and by analyzing log contents, any activity of interest can be troubleshooted. However, logs are unstructured and an acceptable logging standard is yet to be developed for IoT, most commonly due to the enormous varieties of "things" and their fast evolution over time. Thus, it is challenging to analyze log messages from systems like IoT. The exemplary embodiments of the present invention propose a method and system, which can automatically analyze log contents and detect anomalies if any content is statistically different from the normal working behaviors.

In the exemplary embodiments of the present invention, for model building, incoming logs are parsed into a plurality of fields. For every field, an index is maintained, where "key" is the content, and "value" is the frequency count. Based on a statistical property of the indexed contents of a field, one of the following three attributes is assigned to it: IGNORE, MEMBERSHIP_TEST, and RANGE_CHECK. Afterwards, users have an option to review this initial attribute assignment, and the users can change the assignments to incorporate their domain knowledge. Users can also add and/or delete field index content to apply their domain knowledge.

Moreover, during testing, the field model is used to detect content-level anomalies. The incoming logs are parsed into various fields. For every field, based on its model attribute, one of the following three actions is taken. If the attribute is IGNORE, then the field content is simply ignored. If the attribute is MEMBERSHIP_TEST, it is checked whether current field content is present in the model's index. If absent, then an anomaly alert is triggered. If the attribute is RANGE_CHECK, it is checked whether current field content is present within the range of the model's index contents. If it is out of range, then an anomaly alert is triggered. Users can review all anomaly alerts and can provide feedback to correct false positive results. Based on users' feedback, the field index model (or building model) is updated, which helps to improve accuracy of the anomaly detection procedures.

The exemplary embodiments of the present invention provide at least the following advantages: The system can work in an unsupervised fashion. The system does not need any prior knowledge of log structures (or format), and can handle heterogeneous logs. The system provides an option to incorporate users' domain knowledge, and can thus also work in semi-supervised fashion. The system can detect anomalies with a very high accuracy rate since the system can leverage users' feedback to continuously update its internal content-model used for anomaly detection.

Embodiments in accordance with the present invention provide methods and devices for receiving log messages from IoT sensors incorporated in IoT systems/devices/architectures/infrastructures to create a content model builder block or module that is analyzed for anomalies. The content model builder can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The content model builder block or module described herein can be incorporated into any type of electronic devices for any type of use or application or operation.

Figure 1:
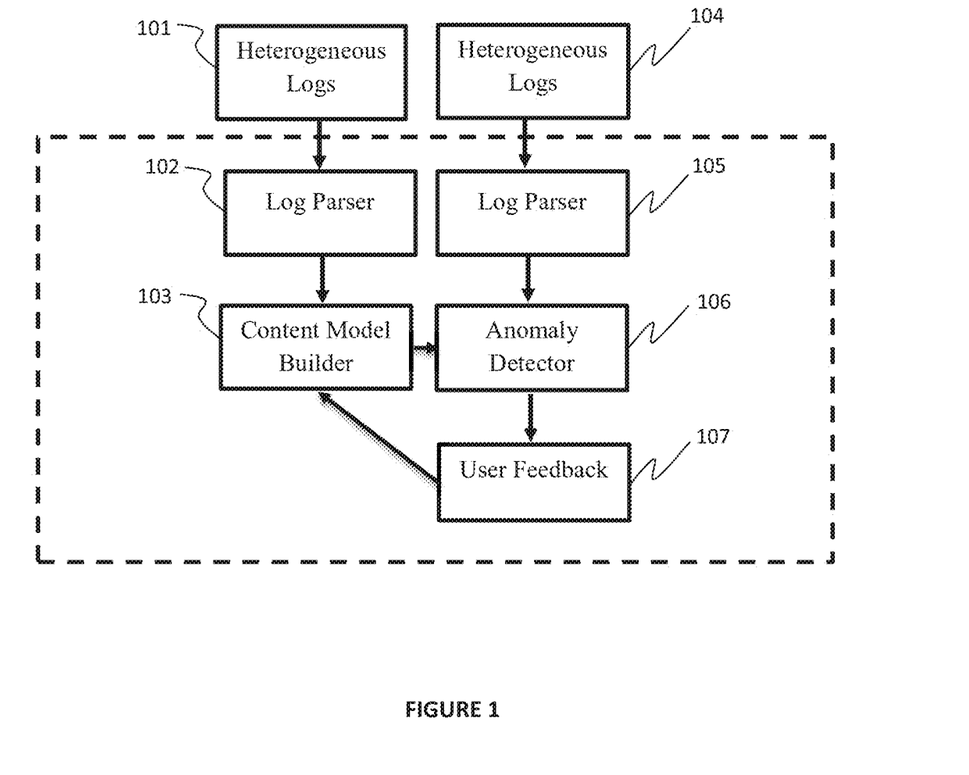
FIG. 1 is a block/flow diagram illustrating a content-level anomaly detection (CLAD) system over a heterogeneous log process, in accordance with embodiments of the present invention.

FIG. 1 illustrates Content Level Anomaly Detection (CLAD) over heterogeneous logs. The system includes the following blocks:

Block 101 refers to heterogeneous log collection for training. Block 101 takes heterogeneous logs from arbitrary and/or unknown systems or applications. A log message includes, e.g., a time stamp and text content with one or multiple fields.

Block 102 refers to log parsing. Block 102 parses log content into various fields based on regular-expression rules.

Block 103 refers to content model generation. Block 103 builds a statistical model for every field identified in block 102.

Block 104 refers to heterogeneous log collection for testing. Block 104 takes heterogeneous logs from arbitrary and/or unknown systems or applications. A log message includes, e.g., a time stamp and text content with one or multiple fields.

Block 105 refers to log parsing. Block 105 parses log content into various fields based on regular-expression rules.

Block 106 refers to anomaly detection. Block 106 analyzes parsed log content output by block 107 based on the field models output by block 103, and outputs anomalies if log content violates normal execution behaviors.

Block 107 refers to user feedback to improve anomaly detection quality. In block 107, users can review the anomalies generated in block 106, and can provide feedback to filter any false positive anomalies in the future.

Figure 2:
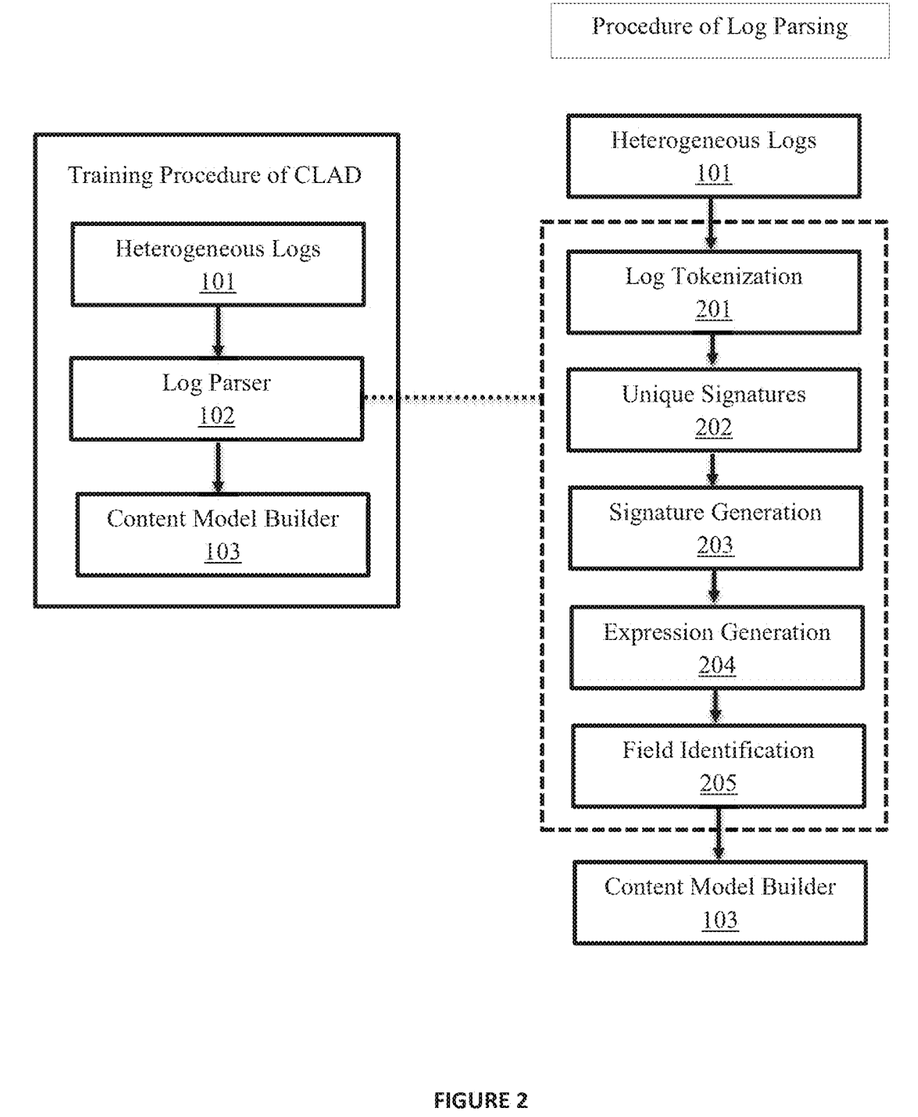
FIG. 2 is a block/flow diagram of a CLAD log parsing procedure, in accordance with embodiments of the present invention.

FIG. 2 illustrates a log parsing procedure. A set of regular expressions for parsing training logs can be provided by users directly, or generated automatically by a pattern recognition procedure on all the heterogeneous logs as follows.

Block 201 refers to log tokenization. When taking arbitrary heterogeneous logs (Block 101), a tokenization is processed in order to generate semantically meaningful tokens from logs. Each incoming log is split based on a delimiter (e.g., space, comma etc.). A set of pre-defined data-types such as date, time, Internet protocol (IP), and number are then detected, and the real value of these fields is replaced with the name of the data-type. For instance, the system replaces 2014-07-09 with "date," 192.168.32.10 with "IP," and "12523" by "number," and so on. This set of pre-defined types can be changed based on user requirements because the user may have an interest regarding real contents of a certain type.

Figure 3:
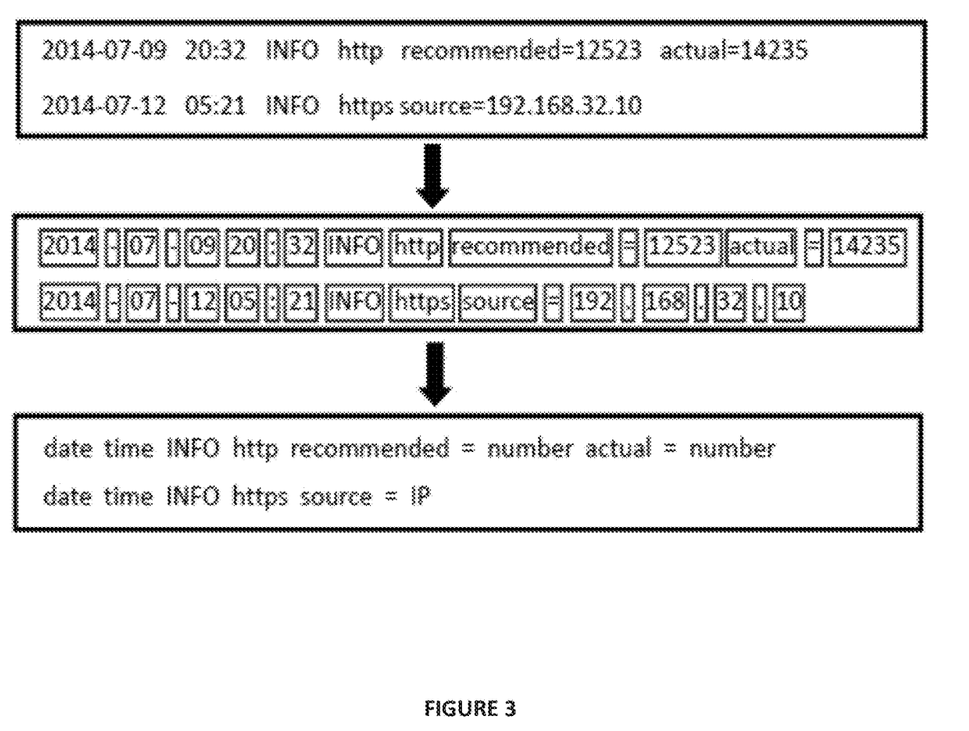
FIG. 3 is a block/flow diagram of an exemplary tokenization procedure, in accordance with embodiments of the present invention.

FIG. 3 shows an illustration of how a log message is tokenized.

Block 202 refers to compact signature generation. In block 202, a compact signature is generated for every log by combining all of its tokens from block 201 into one single word, and a function is applied, which generates a unique numeric value.

Block 203 refers to finding unique signatures. In block 203, the uniqueness of compact signatures generated in block 202 is determined. An index for all unique compact signatures is maintained. Every index entry includes a compact signature as "key" parameter and its associated tokens as a "value" parameter. For every incoming log, this index is looked up using its compact signature. If a match is found, the system indicates that a similar log pattern representing this incoming log has already been found, thus no action needs to be taken. Otherwise, the compact signature with associated token is stored in the index. Note that a memory requirement for generating precise patterns is the space needed for storing this index. In addition, the index size does not depend on a total number of logs processed. Rather, it depends on a unique number of compact signatures.

Block 204 refers to regular expression generation. For every unique signature (e.g., "key"), block 204 generates a regular expression from associated tokens (e.g., "value").

Block 205 refers to field identification. Block 205 performs log field recognition from the regular expression generated in block 204. First, well-known fields such as time stamps, Internet Protocol (IP) addresses, and universal resource locators (URLs) are recognized based on prior knowledge about their syntax structures. Second, fields which are highly stable in the logs are recognized as general constant fields in the regular expressions. Third, the rest of the fields are recognized as general variable fields, including number fields, hybrid string fields, and string fields.

Figure 4:
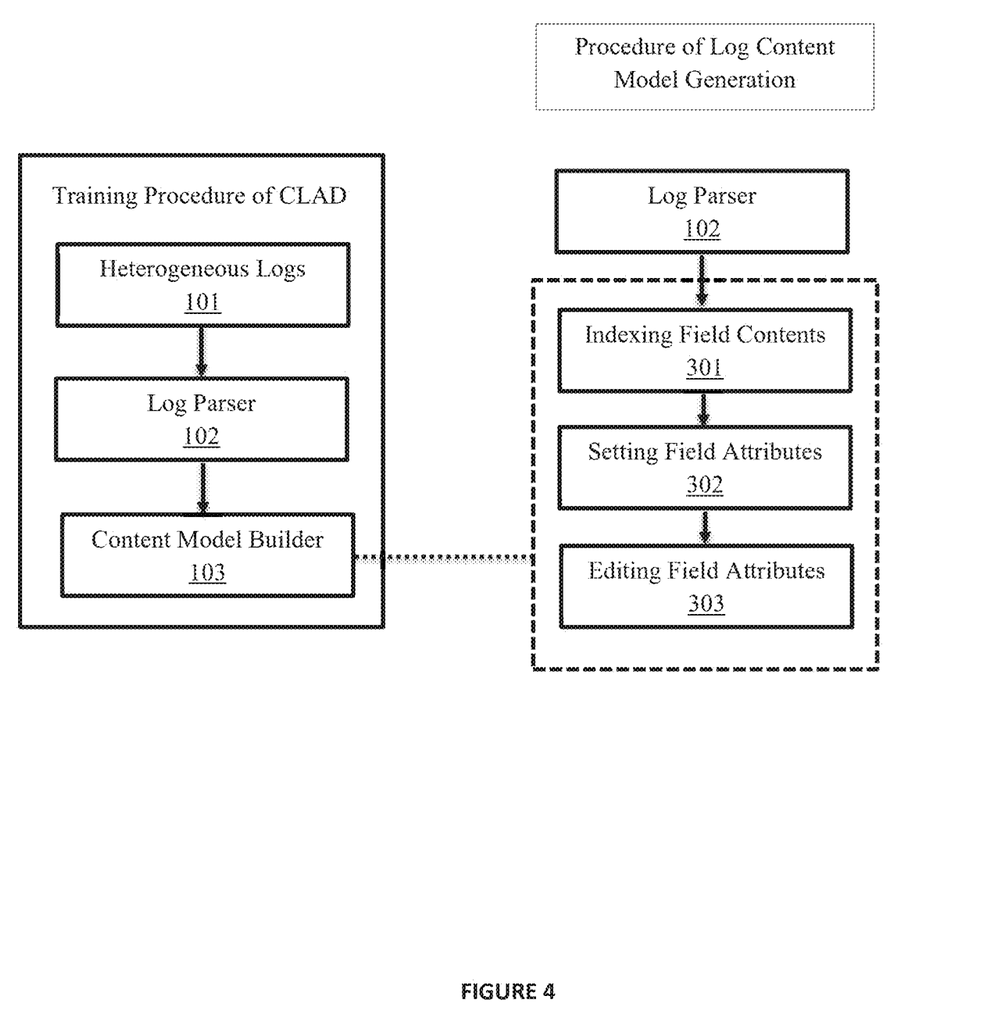
FIG. 4 is a block/flow diagram of a CLAD content model generation procedure, in accordance with embodiments of the present invention.

FIG. 4 illustrates the content-level field model generation procedure. For each log, a series of fields are obtained and associated values are output from block 102. The build field (or content) model is created as follows:

Block 301 refers to indexing field contents. For every field, an index is maintained. This index "key" is field content, and the "value" is a frequency counter. For every parsed log output from block 201, all associated field indexes are looked up. If a match is found, the system indicates that similar field content has already been found, and its counter value is increased by one. Otherwise, the content is stored in the associated field index, and its counter value is set to one.

Block 302 refers to setting field attributes. Once all parsed logs are indexed, every field index is examined to determine its attribute during testing.

A field has, e.g., one of the following three attributes: IGNORE, MEMBERSHIP_TEST, and RANGE_CHECK.

If field contents are random in nature, the attribute is set to IGNORE.

Field randomness is estimated using the following formula:

$$\text{field\_randomness} = \frac{\text{unique content count}}{\text{total frquency count}}$$

If a field's estimated randomness value is greater than a threshold value, it is treated as random, and it can be ignored during testing. The default value of this threshold is set to, e.g., 0.05. However, users can also change this threshold to satisfy their needs.

If the field is not random in nature, then it is classified into two groups: numeric and nonnumeric. If all keys are numeric, then it is classified into a numeric field, otherwise it is classified into a nonnumeric field. For a nonnumeric field, the attribute is set to MEMBERSHIP_TEST. For a numeric field, the attribute can have one following two values: MEMEBERSHIP_TEST and RANGE_CHECK. If the unique content count for a numeric field is more than a threshold value, the attribute is set to RANGE_CHECK. Otherwise, the attribute is set to MEMBERSHIP_TEST. The default threshold value is, e.g., 10. However, users can choose a different threshold value to satisfy their needs.

Block 303 refers to editing field attributes. If users are not satisfied with the attributes generated in block 302, they can manually change the attribute values to satisfy their needs. During testing, user specified attribute values are used for a field to test its contents for anomaly detection.

Note that, users have options to delete any existing data (e.g., training log content) from the field index to reflect their domain knowledge. Users can also add new content (e.g., not present in the training logs) and their frequency information in the index to satisfy her needs.

Figure 5:
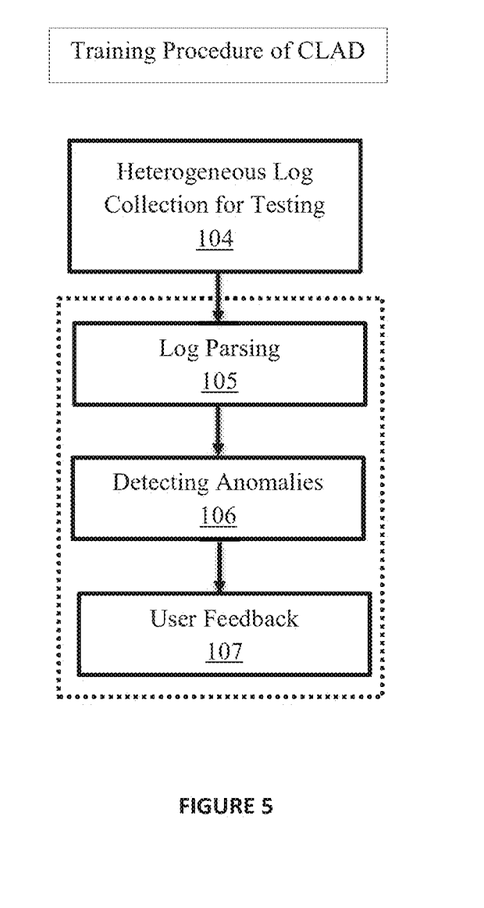
FIG. 5 is a block/flow diagram of a CLAD anomaly detection procedure for testing, in accordance with embodiments of the present invention.

FIG. 5 illustrates the anomaly detection procedure for the testing logs.

Block 105 refers to log parsing. Block 105 is the same as block 102 above.

Block 106 refers to analyzing log contents for detecting anomalies. For every parsed log output from block 105, all associated field indexes are looked up in the file model. If a field's attribute is set to IGNORE, that field's content is simply ignored. If a field's attribute is set to MEMBERSHIP_TEST, its current content is looked up in the index. If content is found, the content is considered normal content. Otherwise, the current field content is detected as an anomaly, and the log message is reported to the user for further review. If a field's attribute is set to RANGE_CHECK, its current content in the model index is looked up to check or determine whether it is within indexed contents of training logs. If it is within range, it is considered normal content. Otherwise, the current field content is detected as an anomaly, and the log message is reported to the user for further review.

Block 107 refers to user feedback to improve quality of the anomaly detection. In block 107, users review the anomalies generated in block 106. If users find that any anomaly is incorrect (e.g., false positive), they can mark it for future filtering. For the marked anomalies, the indexes in the field models are updated to remember or keep track of user feedback.

In summary, the exemplary embodiments of the present invention propose systems and methods for detecting content-level anomaly for logs in an unsupervised and optionally semi-supervised fashion (see, e.g., Blocks 102, 103, 104, 105, 106, 107) by building a content-model based on the field's contents (Block 103), maintaining index and metadata (Block 301), generating attributes for fields (Block 302), editing model capability to incorporate users' domain knowledge (Block 303), detecting anomalies using field attributes (Block 106), and improving anomaly quality by using user feedback (Block 107).

Figure 6:
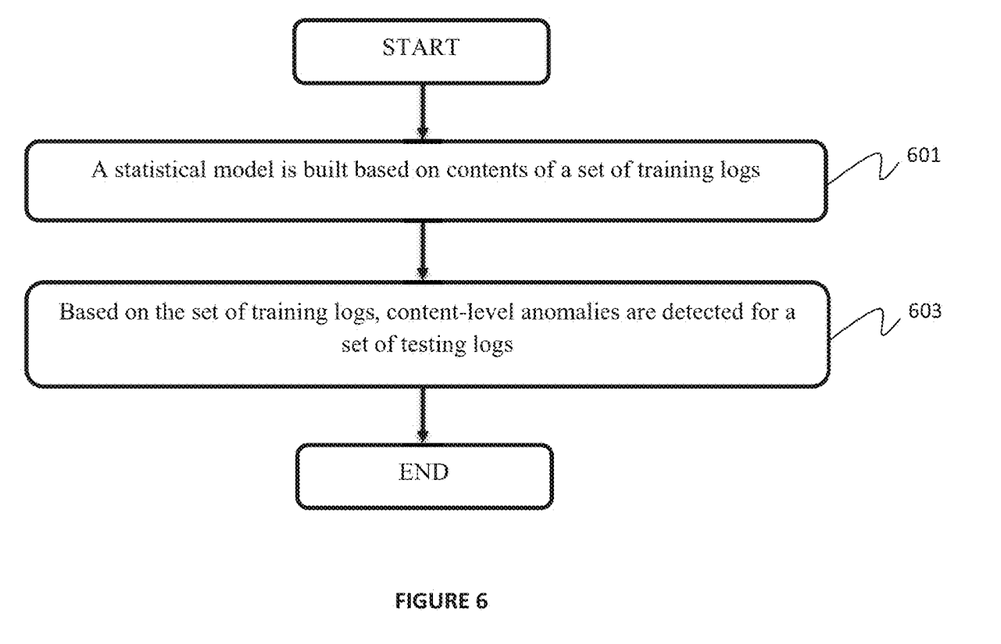
FIG. 6 is a block/flow diagram of a method for detecting content-level anomalies, in accordance with embodiments of the present invention.

FIG. 6 is a block/flow diagram of a method for detecting content-level anomalies, in accordance with embodiments of the present invention.

At block 601, a statistical model is built based on contents of a set of training logs.

At block 603, based on the set of training logs, content-level anomalies are detected for a set of testing logs.

Figure 7:
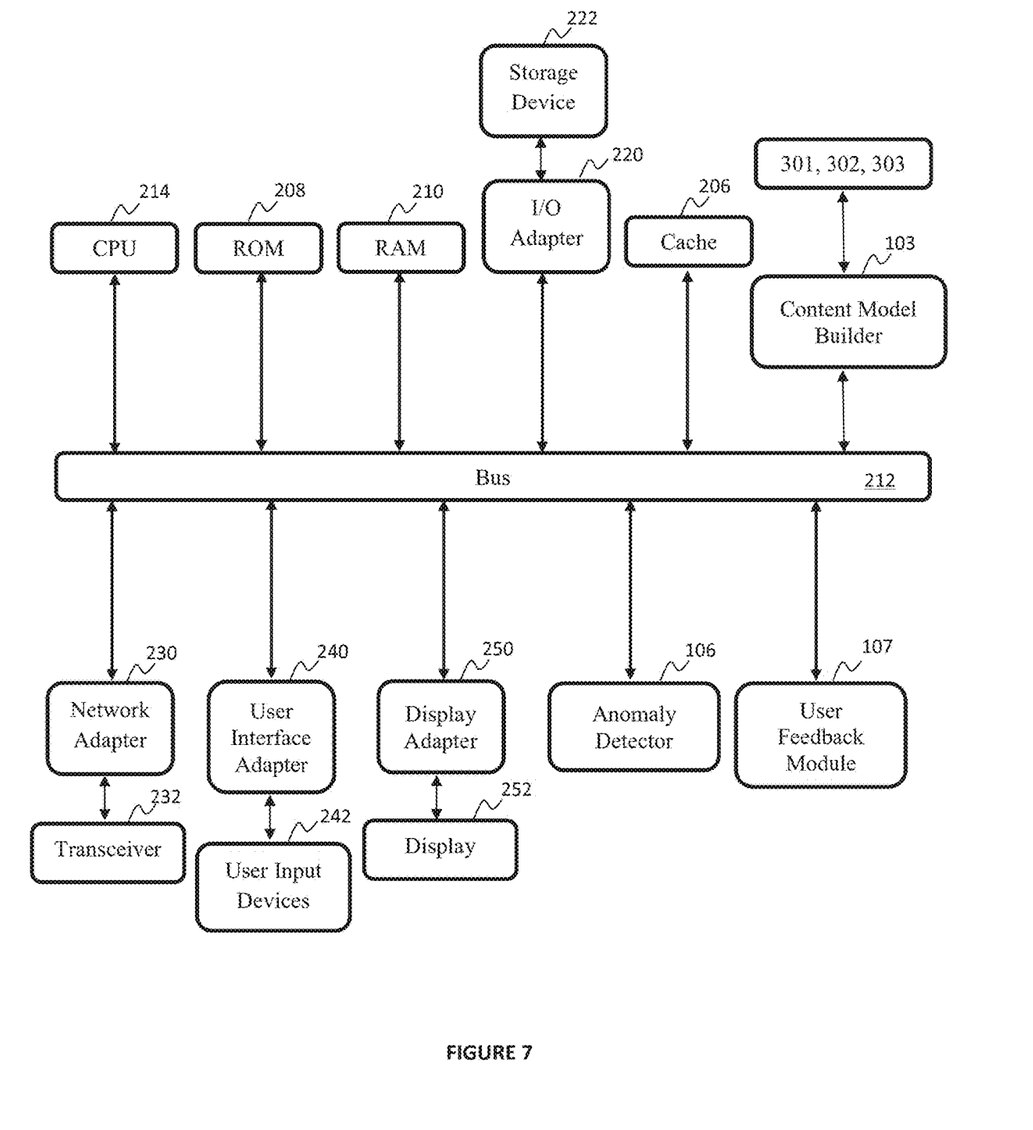
FIG. 7 is an exemplary processing system for detecting content-level anomalies, in accordance with embodiments of the present invention.

FIG. 7 is an exemplary processing system for detecting content-level anomalies, in accordance with embodiments of the present invention.

The processing system includes at least one processor (CPU) 214 operatively coupled to other components via a system bus 212. A cache 206, a Read Only Memory (ROM) 208, a Random Access Memory (RAM) 210, an input/output (I/O) adapter 220, a network adapter 230, a user interface adapter 240, and a display adapter 250, are operatively coupled to the system bus 212. Additionally, content model builder block 103, anomaly detector block 106, and user feedback block 107 are operatively coupled to the system bus 212. The content model builder block 103 is operatively coupled to indexing field contents block 301, setting field attributes block 302, and editing field attributes block 303.

A storage device 222 is operatively coupled to system bus 212 by the I/O adapter 220. The storage device 222 can be any of a disk storage device (e.g., a magnetic or optical disk storage device), a solid state magnetic device, and so forth.

A transceiver 232 is operatively coupled to system bus 212 by network adapter 230.

User input devices 242 are operatively coupled to system bus 212 by user interface adapter 240. The user input devices 242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 242 can be the same type of user input device or different types of user input devices. The user input devices 242 are used to input and output information to and from the processing system.

A display device 252 is operatively coupled to system bus 212 by display adapter 250.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
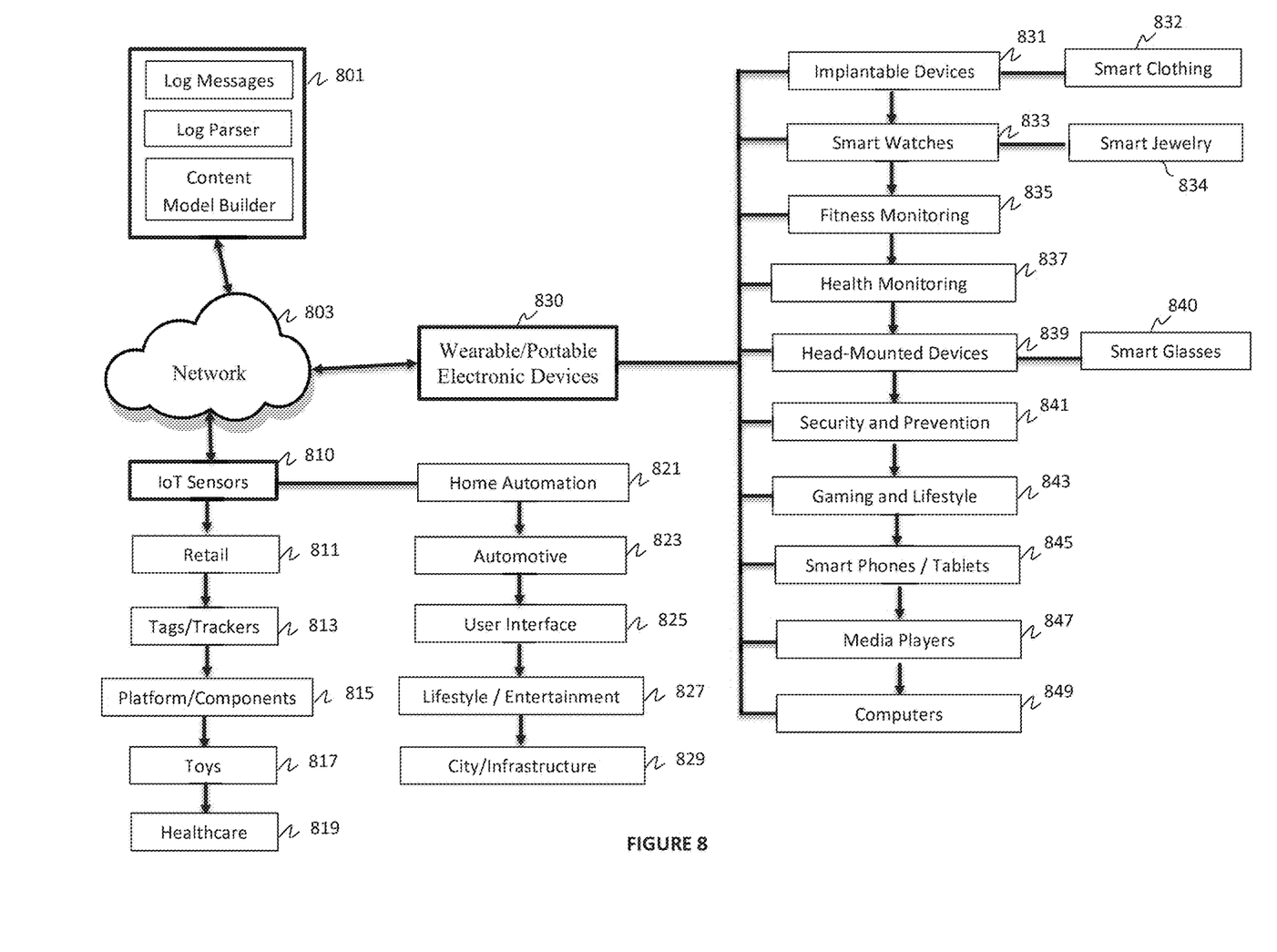
FIG. 8 is a block/flow diagram of a method for analyzing log messages received from Internet of Things (IoT) systems/devices/infrastructure and detecting content-level anomalies, in accordance with embodiments of the present invention.

FIG. 8 is a block/flow diagram of a method for analyzing log messages received from Internet of Things (IoT) systems/devices/infrastructure and detecting content-level anomalies, in accordance with embodiments of the present invention.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. They enhance data collection, automation, operations, and much more through smart devices and powerful enabling technology.

IoT systems allow users to achieve deeper automation, analysis, and integration within a system. They improve the reach of these areas and their accuracy. IoT utilizes existing and emerging technology for sensing, networking, and robotics. Features of IoT include artificial intelligence, connectivity, sensors, active engagement, and small device use.

In various embodiments, the content model builder block 103 of the present invention can be incorporated into a variety of different devices and/or systems. The log messages of content-level analyzer for anomaly detection block 801 can be received via a network 803. For example, the content model builder block 103 can be incorporated into wearable or portable electronic devices 830. Wearable/portable electronic devices 830 can include implantable devices 831, such as smart clothing 832. Wearable/portable devices 830 can include smart watches 833, as well as smart jewelry 834. Wearable/portable devices 830 can further include fitness monitoring devices 835, health and wellness monitoring devices 837, head-mounted devices 839 (e.g., smart glasses 840), security and prevention systems 841, gaming and lifestyle devices 843, smart phones/tablets 845, media players 847, and/or computers/computing devices 849.

The content model builder block 103 of the present invention can be further incorporated into Internet of Thing (IoT) sensors 810 for various applications, such as home automation 821, automotive 823, user interface 825, lifestyle and/or entertainment 827, city and/or infrastructure 829, retail 811, tags and/or trackers 813, platform and components 815, toys 817, and/or healthcare 819. The IoT sensors 810 can communicate with the content model builder block 103 via network 803. Of course, one skilled in the art can contemplate incorporating such content model builder block 103 formed therein into any type of electronic devices for any types of applications, not limited to the ones described herein.

Figure 9:
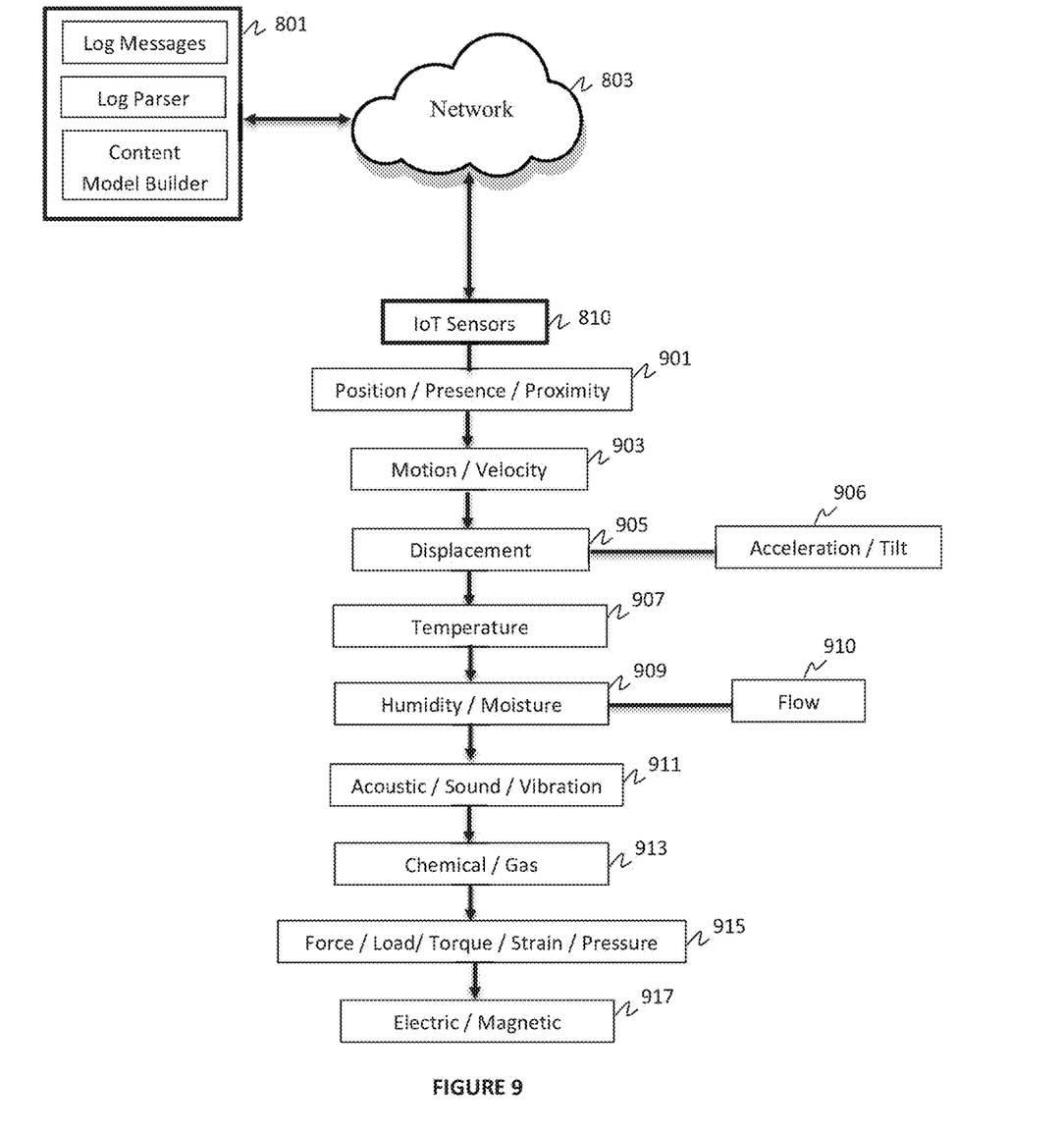
FIG. 9 is a block/flow diagram of exemplary IoT sensors used to collect data/information related to log messages to be analyzed by the content model builder, in accordance with embodiments of the present invention.

FIG. 9 is a block/flow diagram of exemplary IoT sensors used to collect data/information related to log messages to be analyzed by the content model builder, in accordance with embodiments of the present invention.

IoT loses its distinction without sensors. IoT sensors act as defining instruments which transform IoT from a standard passive network of devices into an active system capable of real-world integration.

The IoT sensors 810 can be connected via network 803 to transmit information/data, continuously and in in real-time, to the content-level analyzer for anomaly detection block 801, which includes the content model builder block 103. Exemplary IoT sensors 810 can include, but are not limited to, position/presence/proximity sensors 901, motion/velocity sensors 903, displacement sensors 905, such as acceleration/tilt sensors 906, temperature sensors 907, humidity/moisture sensors 909, as well as flow sensors 910, acoustic/sound/vibration sensors 911, chemical/gas sensors 913, force/load/torque/strain/pressure sensors 915, and/or electric/magnetic sensors 917. One skilled in the art can contemplate using any combination of such sensors to collect data/information or log messages to be parsed and input into the content model builder block or module 103 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks (e.g., that send log messages to a content model builder block or module 103). Then the data collection software collects data from multiple devices and distributes it in accordance with settings. Data collection software also works in reverse by distributing data over devices. The system can eventually transmit all collected data to, e.g., a central server.

Additionally, real-time analytics applications take data or input from various devices and convert it into viable actions or clear patterns for human analysis. They analyze information based on various settings and designs in order to perform automation-related tasks or provide the data required by industry. In the instant case, real-time analytics applications can aid the current system in sending log messages, analyzing log messages, parsing log messages, and creating to a content model builder block or module 103 based on the parsed log messages, we well as detecting anomalies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The terms "block" and "module" can be used interchangeably herein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for automatically analyzing log contents received via a network and detecting content-level anomalies, the method comprising:
  building a statistical model based on contents of a set of training logs; and detecting, based on the set of training logs, content-level anomalies for a set of testing logs,
wherein the building of the statistical model includes parsing incoming logs into a plurality of fields.

2. The method of claim 1, wherein each field of the plurality of fields includes an index where a key parameter refers to content and a value parameter refers to frequency count.

3. The method of claim 2, wherein the following attributes are assigned to each field of the plurality of fields: an IGNORE attribute, a MEMBERSHIP_TEST attribute, and a RANGE_CHECK attribute.

4. The method of claim 3, wherein if the attribute is the MEMBERSHIP_TEST attribute, it is determined if current field content is present in the statistical model's index.

5. The method of claim 3, wherein if the attribute is the RANGE_CHECK attribute, it is determined if current field content is present within a range of the statistical model's index contents.

6. The method of claim 3, wherein users are permitted to review assignments of the attributes and modify one or more of the assignments to incorporate their domain knowledge.

7. The method of claim 3, wherein users are permitted to add and delete training log content to incorporate their domain knowledge.

8. A system for automatically analyzing log contents received via a network and detecting content-level anomalies, the system comprising:
a memory; and
a processor in communication with the memory, wherein the processor is configured to:
build a statistical model based on contents of a set of training logs; and
detect, based on the set of training logs, content-level anomalies for a set of testing logs,
wherein the building of the statistical model includes parsing incoming logs into a plurality of fields.

9. The system of claim 8, wherein each field of the plurality of fields includes an index where a key parameter refers to content and a value parameter refers to frequency count.

10. The system of claim 9, wherein the following attributes are assigned to each field of the plurality of fields: an IGNORE attribute, a MEMBERSHIP_TEST attribute, and a RANGE_CHECK attribute.

11. The system of claim 10, wherein if the attribute is the MEMBERSHIP_TEST attribute, it is determined if current field content is present in the statistical model's index.

12. The system of claim 10, wherein if the attribute is the RANGE_CHECK attribute, it is determined if current field content is present within a range of the statistical model's index contents.

13. The system of claim 10, wherein users are permitted to review assignments of the attributes and modify one or more of the assignments to incorporate their domain knowledge.

14. The system of claim 10, wherein users are permitted to add and delete training log content to incorporate their domain knowledge.

15. A non-transitory computer-readable storage medium comprising a computer-readable program for automatically analyzing log contents received via a network and detecting content-level anomalies, wherein the computer-readable program when executed on a computer causes the computer to perform the steps of:
building a statistical model based on contents of a set of training logs; and
detecting, based on the set of training logs, content-level anomalies for a set of testing logs,
wherein the building of the statistical model includes parsing incoming logs into a plurality of fields.

16. The non-transitory computer-readable storage medium of claim 15, wherein each field of the plurality of fields including an index where a key parameter refers to content and a value parameter refers to frequency count.

17. The non-transitory computer-readable storage medium of claim 16, wherein the following attributes are assigned to each field of the plurality of fields: an IGNORE attribute, a MEMBERSHIP_TEST attribute, and a RANGE_CHECK attribute.

18. The non-transitory computer-readable storage medium of claim 17,
wherein if the attribute is the MEMBERSHIP_TEST attribute, it is determined if current field content is present in the statistical model's index; and
wherein if the attribute is the RANGE_CHECK attribute, it is determined if the current field content is present within a range of the statistical model's index contents.

* * * * *